(12) United States Patent
Williams et al.

(10) Patent No.: US 7,261,015 B2
(45) Date of Patent: Aug. 28, 2007

(54) COLLAPSIBLE PEDAL BOX

(75) Inventors: Christopher Williams, Leicester (GB); Donald Byron, Lincoln (GB); Pierre Sauvenée, Worcestershire (GB)

(73) Assignee: Dura Automotive Limited (GB)

( * ) Notice: Subject to any disclaimer, the term of this patent is extended or adjusted under 35 U.S.C. 154(b) by 37 days.

(21) Appl. No.: 10/398,426

(22) PCT Filed: Sep. 17, 2001

(86) PCT No.: PCT/GB01/04148

§ 371 (c)(1), (2), (4) Date: Jul. 8, 2003

(87) PCT Pub. No.: WO02/30718

PCT Pub. Date: Apr. 18, 2002

(65) Prior Publication Data

US 2004/0031350 A1  Feb. 19, 2004

(30) Foreign Application Priority Data

Oct. 7, 2000  (GB) .................................. 00246033

(51) Int. Cl.
*G05G 1/14* (2006.01)
*B60K 28/10* (2006.01)

(52) U.S. Cl. .................. 74/512; 74/560; 180/274; 280/784

(58) Field of Classification Search ............ 74/507, 74/512, 513, 514, 560; 180/371, 376, 377, 180/274; 280/274, 784, 777
See application file for complete search history.

(56) References Cited

U.S. PATENT DOCUMENTS

| | | | | |
|---|---|---|---|---|
| 4,637,741 A | * | 1/1987 | Gillet | 384/428 |
| 5,996,439 A | * | 12/1999 | Elton et al. | 74/512 |
| 6,142,036 A | * | 11/2000 | Mizuma et al. | 74/512 |
| 6,612,200 B1 | * | 9/2003 | Rixon | 74/560 |
| 6,880,665 B2 | * | 4/2005 | Oprisch | 180/274 |

FOREIGN PATENT DOCUMENTS

| | | |
|---|---|---|
| EP | 0827874 | 3/1998 |
| EP | 1 038 720 | 9/2000 |
| FR | 2 764 715 | 12/1998 |
| WO | WO95/08145 | 3/1995 |
| WO | WO97/28029 | 8/1997 |

* cited by examiner

*Primary Examiner*—Thomas R. Hannon
*Assistant Examiner*—Justin Krause
(74) *Attorney, Agent, or Firm*—Kevin S Mackenzie; Gifford Krass Sprinkle Groh; Dean B. Watson (57) ABSTRACT

A collapsible pedal box for an automobile is designed to collapse in the case of a frontal impact of the automobile, to reduce the risk of trapping the driver's feet. One or more pedals (13) are supported on a pivot shaft which is supported at its ends by pivot shaft supports (15,17) locked with respect to the side walls (1,3) of the pedal box that they are prevented from moving outwardly along an axis of the pivot shaft. Relative movement between the pedal box and another structural member within the driver's compartment in the case of a front-end impact causes first the unlocking and then the movement apart of the pivot shaft supports (15,17), and release of the pivot shaft and pedal assembly.

13 Claims, 13 Drawing Sheets

FIG. 15 ically locked with respect to side walls of the pedal box such that they are prevented from moving outwardly along an axis of the pivot shaft, characterized in that relative movement between the pedal box and another member of the automobile in the event of a frontal impact unlocks the pivot shaft end supports with respect to the side walls so that they can move mutually
COLLAPSIBLE PEDAL BOX

FIELD OF THE INVENTION

This invention relates to pedal boxes for automobiles, and to structures which are designed to collapse in the event of a front-end vehicle collision.

BACKGROUND ART

The improved design of safety shell structures around the driving compartment of a motor vehicle, and the improvements in the shock absorbing characteristics of engine compartments have meant that it is now much less likely that the driver of a vehicle in a front-end collision will be killed outright. With that increase in vehicle safety comes another concern, which is that the driver whose life has been spared by good vehicle design should not become injured or trapped in the vehicle by the pedal box structure around the driver's feet.

Brake and clutch pedal boxes have been proposed which collapse on application of an excessive load such as that applied by the forward momentum of a driver when the vehicle is in a front-end collision. A collapse of the pedal box in such a situation permits the pedals of the vehicle to move forward and away from the driver's feet, providing important extra legroom to reduce the risk of the driver's feet becoming trapped in the accident. Even a few centimetres of extra legroom in such circumstances can be a significant safety advantage.

Various prior proposals for collapsible pedal box design have contemplated making the pedal box collapse dependent on the impact itself. It is however important to reduce as much as possible the extent to which the reaction pressure of the driver's foot on the pedal or pedals is necessary to initiate pedal box collapse. Similarly it is important to reduce as much as possible the reliance on any other member which might come into contact with the driver, such as a steering column member, as a source of the reaction pressure.

A collapsible pedal box has previously been described in EP 0827874. The pivot shaft is journalled between pivot shaft supports which are permanently mounted on the inner surface of the opposing side walls. In the event of a frontal impact, a member in the passenger compartment collides with the front of the two side walls forcing them apart while on the engine side the side plates are brought together. Accordingly, the two pivot shaft supports are forced apart to release the pivot shaft. However, since the two side walls twist in opposite directions during the impact, the two pivot shafts are unable to move mutually apart along the axis of the pivot shaft and so there is a greater likelihood that the pivot shaft will still be retained by one of the supports after impact.

SUMMARY OF THE INVENTION

The invention provides a pedal box for pivotally supporting one or more control pedals of an automobile, wherein a pivot shaft for the pedal or pedals is journalled at its ends in discrete pivot shaft end supports which are physically locked with respect to side walls of the pedal box such that they are prevented from moving outwardly along an axis of the pivot shaft, characterized in that relative movement between the pedal box and another member of the automobile in the event of a frontal impact unlocks the pivot shaft end supports with respect to the side walls so that they can move mutually apart along the axis of the pivot shaft thereby causing release of the pivot shaft from the pivot shaft end supports so as to initiate collapse of the one or more pedals. By relying on the relative movement between the pedal box and the other member of the automobile to effect the release of the ends of the pivot shaft mounting the control pedal or pedals, true synchronization of the collapsing driver's compartment and pedal collapse can be reliably obtained in the event of a frontal impact of the vehicle.

Preferably the pivot shaft end supports are spring-biased to move them mutually apart after they have been unlocked with respect to side walls of the pedal box, thus releasing the ends of the pivot shaft from the shaft end supports. Alternatively continued relative movement between the pedal box and the other member in the driver's compartment may be effective to bias apart the unlocked pivot shaft end supports by cam action. A further alternative is for the unlocked pivot shaft end supports to be moved mutually apart, after unlocking, by a combination of spring-bias and cam action forces.

In one embodiment of the invention, the unlocking of the pivot shaft end supports is achieved by rotary movement of the pivot shaft end supports imparted by contact between the relatively movable member in the driver's compartment and lever portions of the pivot shaft end supports. Where a cam action is used to bias the pivot shaft end supports apart, that cam action is preferably a cam action between cooperating surfaces of the pivot shaft end supports and the relatively movable element in the driver's compartment, or between the pivot shaft end supports and cooperating surfaces of the pedal box. The latter cam action may be achieved, for example, by rotary movement of the pivot shaft end supports which on rotation bear against the pedal box. Such rotary movement is imparted by contact between the relatively movable member in the driver's compartment and lever portions of the pivot shaft end supports, and is preferably a continuation of the rotary movement which unlocks the pivot shaft end supports from the side walls of the pedal box.

A second embodiment of a pedal box according to the invention further comprises a latch member and a release spring, wherein, in use, the latch member is locked to the side walls of the pedal box in a first position and prevents the pivot shaft end supports from moving mutually apart whereas the release spring is in a compressed state biasing the pivot shaft end supports mutually apart such that in the event of a frontal impact the latch member is unlocked from the side walls and moves to a second position thereby releasing the pivot shaft end supports and the release spring relaxes to force the pivot shaft end supports mutually apart along the axis of the pivot shaft through holes in the side walls of the pedal box.

Preferably, in addition to biasing the pivot shaft end supports apart, the release spring also biases the latch member from the first position to the second position.

Preferably, the latch member is locked in its first position to the side walls of the pedal box by one or more outwardly extending detents which engage with corresponding recesses provided in the side walls of the pedal box and in the event of a frontal impact, the detents shear permitting the latch member to move to the second position.

Figure 1:
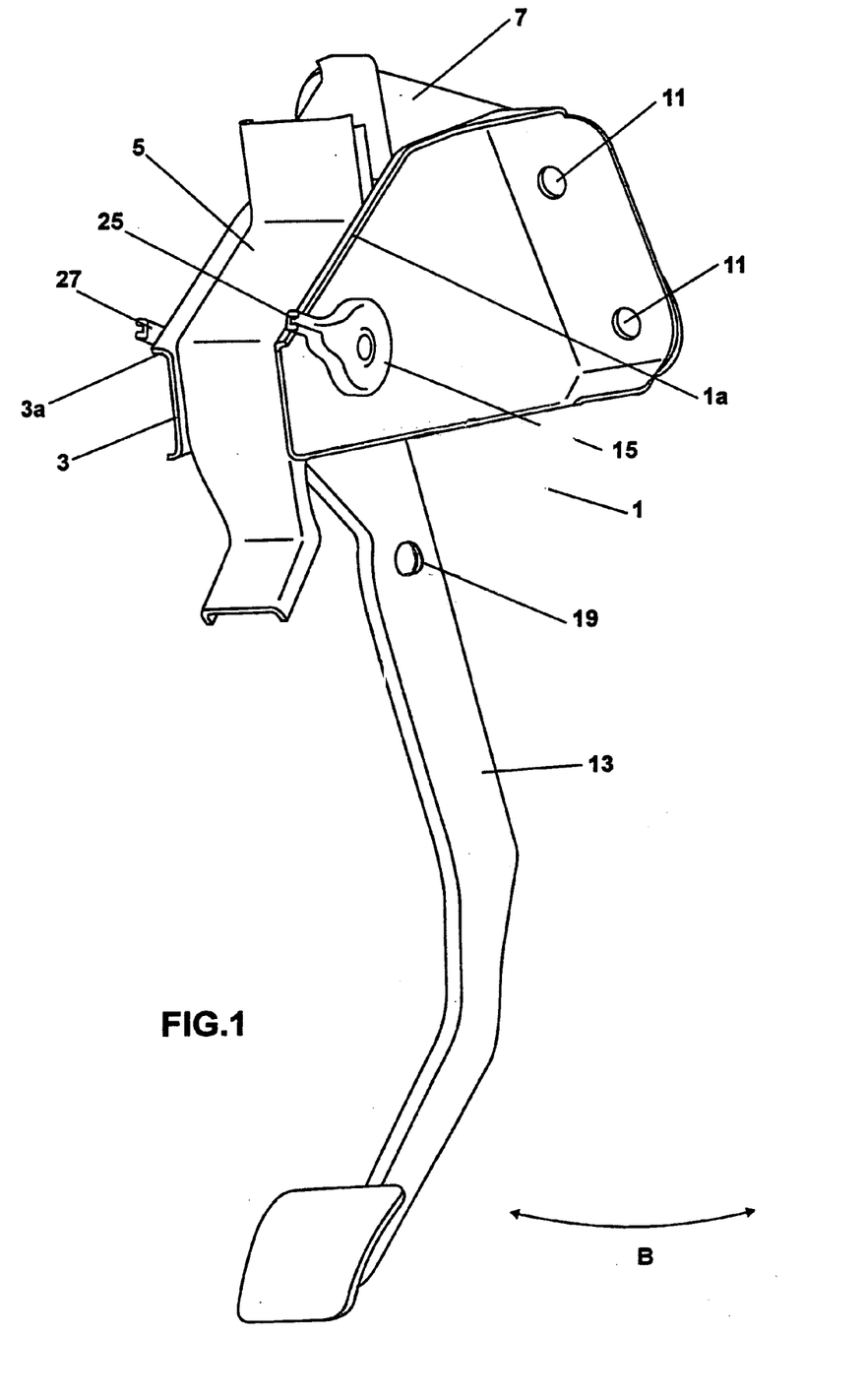
FIG. 1 is a perspective view of a pedal box according to a first embodiment of the invention.
Figure 2:
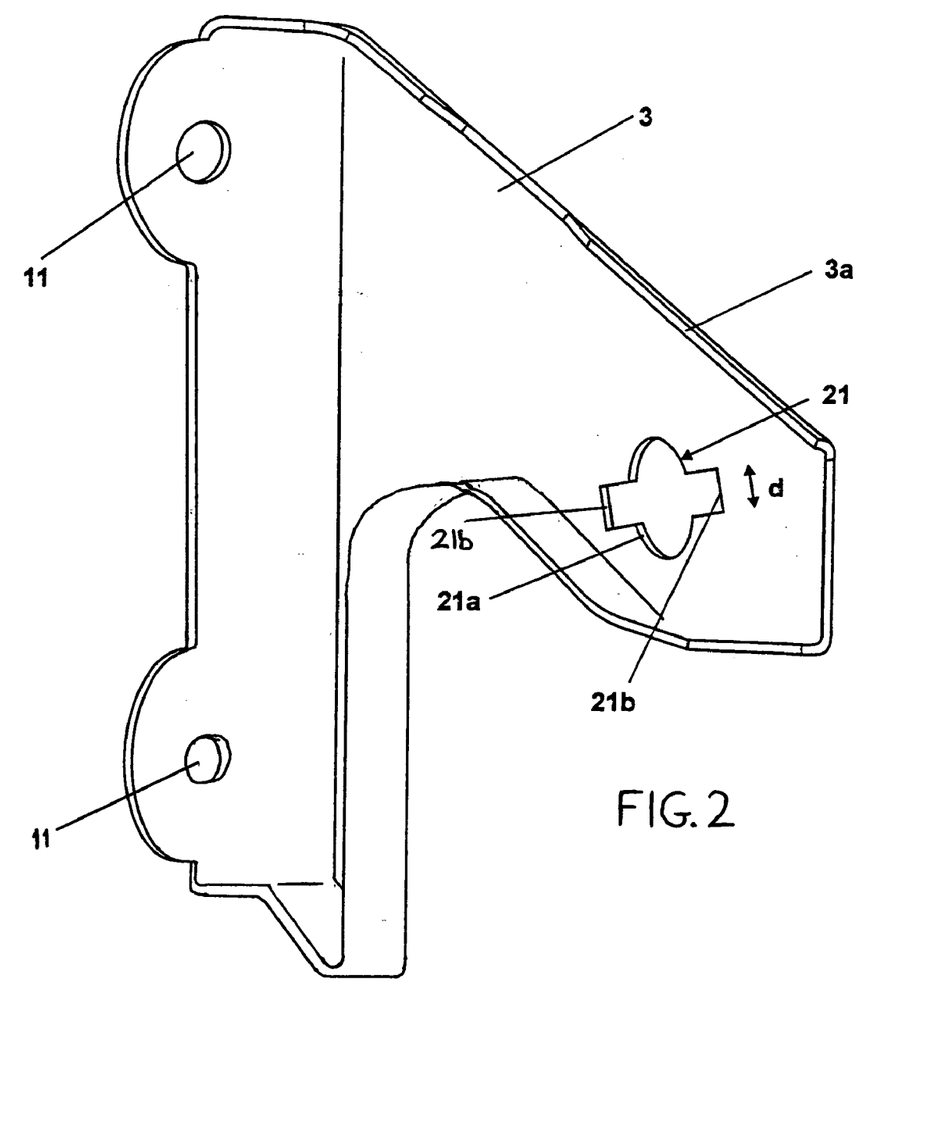
FIG. 2 is a perspective view of the far side wall of the pedal box as viewed in FIG. 1.

FIG. 1 shows a pedal box according to the invention comprising two side walls 1,3 joined together in a rigid box formation by a front end top wall 5 and a rear wall 7. In use the pedal box is bolted to a rigid bulwark 9 separating the engine compartment of an automobile from the passenger compartment. The bulwark 9 is shown schematically in section only in FIG. 5, and bolt-mounting holes 11 are shown in FIGS. 1 and 2.

Mounted between the side walls 1 and 3 of the pedal box is a control pedal 13 of the automobile. The pedal 13 may be a brake pedal, a clutch pedal or an accelerator pedal, or a group of two or more such pedals mounted on a single pivot shaft. The pivot shaft (not shown) is journalled at its opposite ends in a pair of pivot shaft supports 15,17 and is pivotally suspended beneath the pedal box. A return spring (not shown) is in use anchored at one end to a stub shaft 19 on the pedal 13, and the pedal in use is capable of movement in an arc as indicated by the double-headed arrow B.

Figure 3:
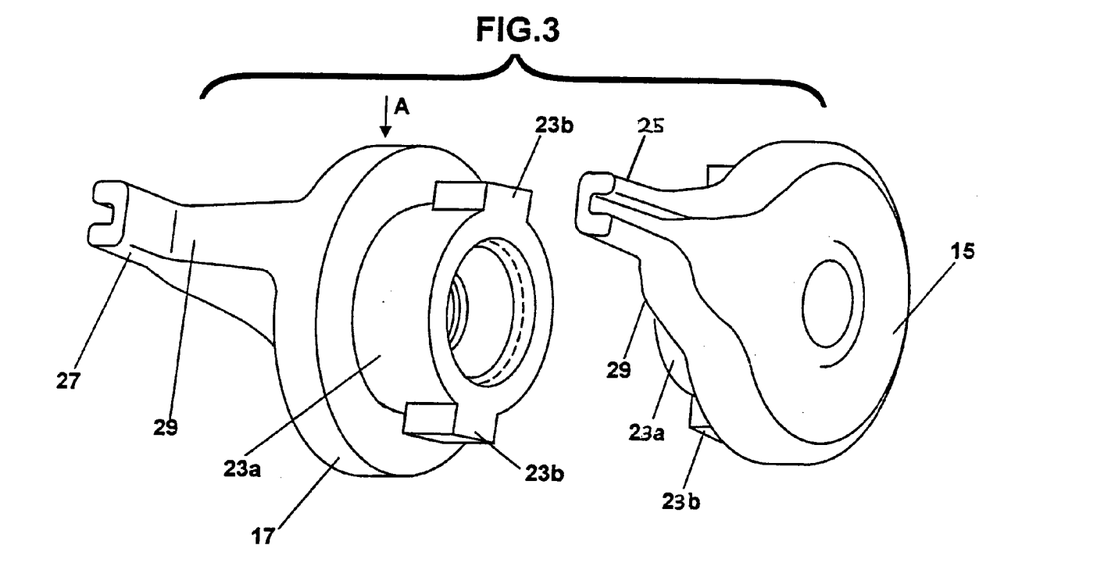
FIG. 3 is a perspective view of the pair of pivot shaft supports of FIG. 1, viewed from the same angle as in FIG. 1.

The pivot shaft supports 15,17 pass through the side walls 1,3 of the pedal box from the outside, and present two journals one for each end of the pivot shaft of the pedal 13. The pivot shaft is shorter than the spacing between the side walls 1,3 so that if the pivot shaft supports 15,17 were withdrawn back through the side walls 1,3 the pivot shaft would fall away from the pedal box. In normal use, however, the shaft supports 15,17 are locked to the side walls 1,3 because the holes 21 through which they pass are butterfly-shaped as shown in FIG. 2, with a circular inner locating portion 21a and two diametrically opposed release portions 21b of larger diameter. The shaft supports 15,17 have cylindrical journal housing portions 23a of the same diameter as the locating portions 21a, and diametrically opposed locking wings 23b which pass through the release portions 21b and then lock against the inside faces of the side walls 1,3 when the shaft supports 15,17 are rotated to the positions shown in FIGS. 1 and 5. It should be understood that the angular width "d" (FIG. 2) of the release portions 21b is greater than the angular length "e" (FIG. 3) of the locking wings 23b, so that some free angular rotation of the shaft supports 15,17 is permitted while the locking wings 23b lie within the boundaries of the release portions 21b.

Figure 4:
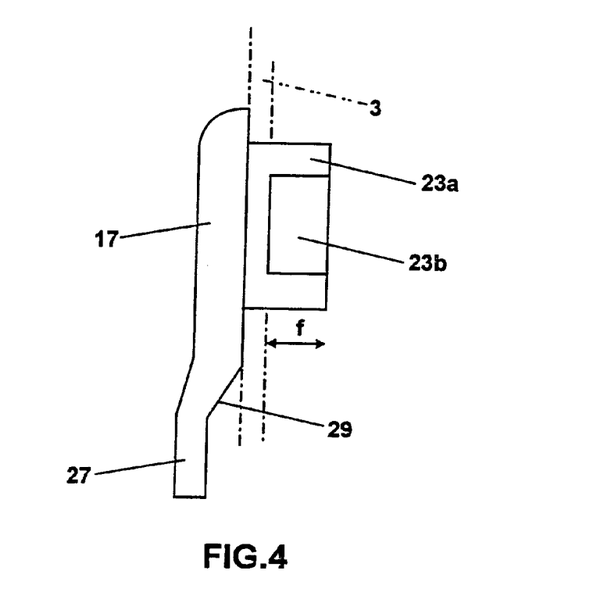
FIG. 4 is a side elevation of one of the pivot shaft supports of FIG. 3, viewed in the direction of arrow A.

FIG. 4 illustrates how one such shaft support 17 passes through the side wall 3 of the pedal box (shown in chain-dotted line) and is locked thereto by the locking wings 23b. The depth "f" of the shaft support 17 on the inside of the pedal box provides the journal support for the end of the pivot shaft.

Each of the shaft supports 15,17 has a lever portion 25,27 which in use extends upwardly past the pedal box beyond the top wall 5 of the pedal box, and beyond a pair of straight outwardly-turned flanges 1a,3a of the side walls 1,3 of the pedal box. The combination of the flanges 1a,3a and the top wall 5 of the pedal box create a guide surface which sweeps along a relatively rigid member in the driver's compartment when, in the case of a severe frontal impact of the automobile, the pedal box is pushed into the driver's compartment. The relatively rigid member in the driver's compartment may, for example, be a bracket 30 (FIG. 5) supporting a steering column, such that the flanges 1a,3a are swept by that bracket when a front-end impact pushes the pedal box rearwardly of the automobile.

Figure 5:
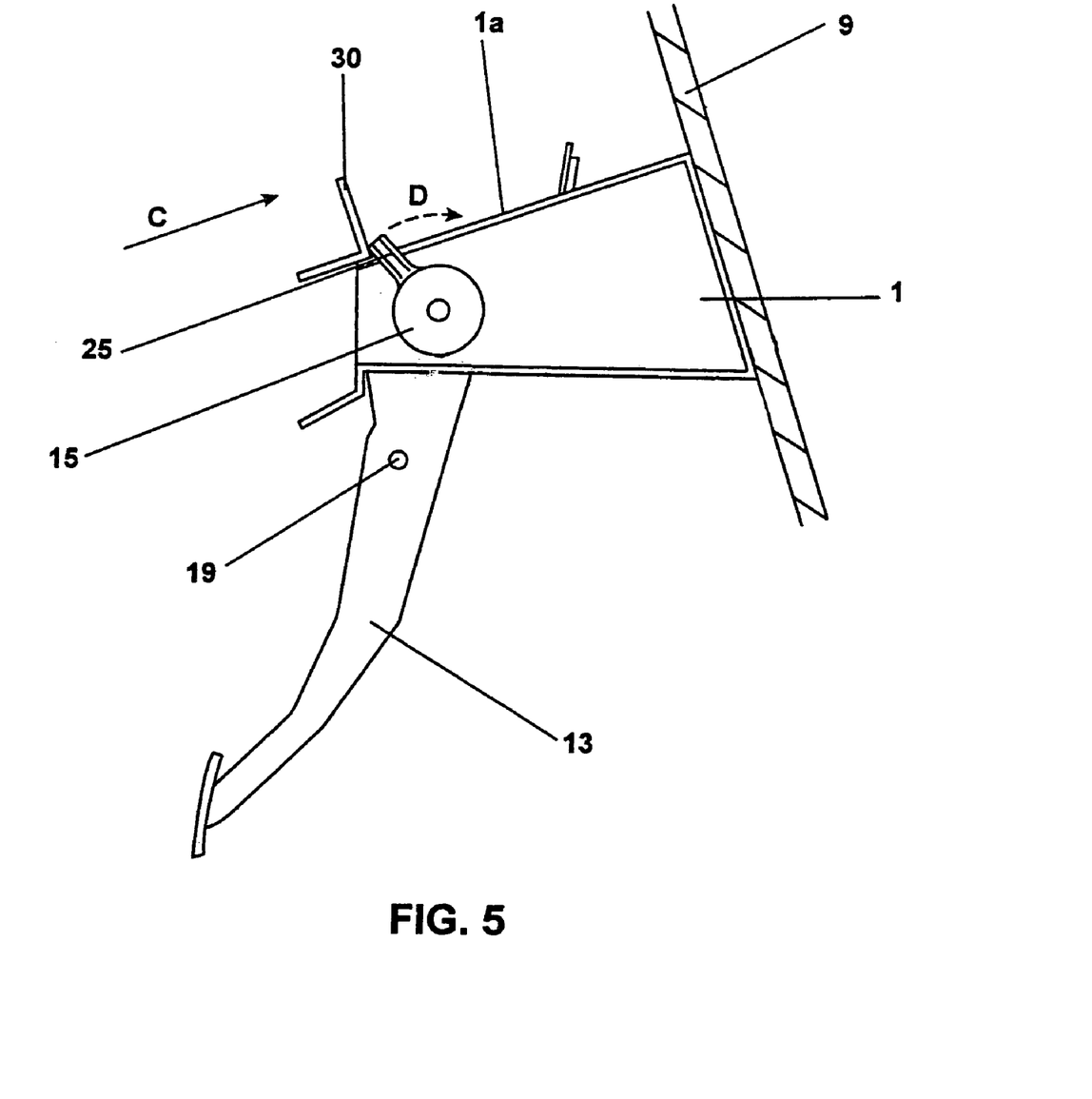
FIG. 5 is a side elevation of the pedal box of FIGS. 1 to 4 in position in an automobile, illustrating its cooperation with an element of a relatively movable member in the driver's compartment.

Initial relative movement between the pedal box and the bracket 30 causes the bracket 30 to move in the direction of the arrow C of FIG. 5, bearing against the lever portions 25,27 and rotating the shaft supports 15,17 in the direction of the arrow D. Initial rotation, corresponding to the above initial and partial relative movement, causes the shaft supports 15,17 to become unlocked from the pedal box side walls so that they are capable of moving mutually apart to release the pivot shaft ends of the pedal 13. Continued rotation, caused by continued and progressive relative movement, causes identical angled cam surfaces 29 of the two shaft supports 15,17 to ride up the out-turned flanges 1a,3a of the pedal box side walls 1,3 to cam the shaft supports outwardly. The ends of the pivot shaft of the pedal 13 are therefore released from the shaft supports 15,17 and the pedal falls away to minimize the risk of trapping the driver's feet as a result of the front-end impact of the vehicle.

Figure 6:
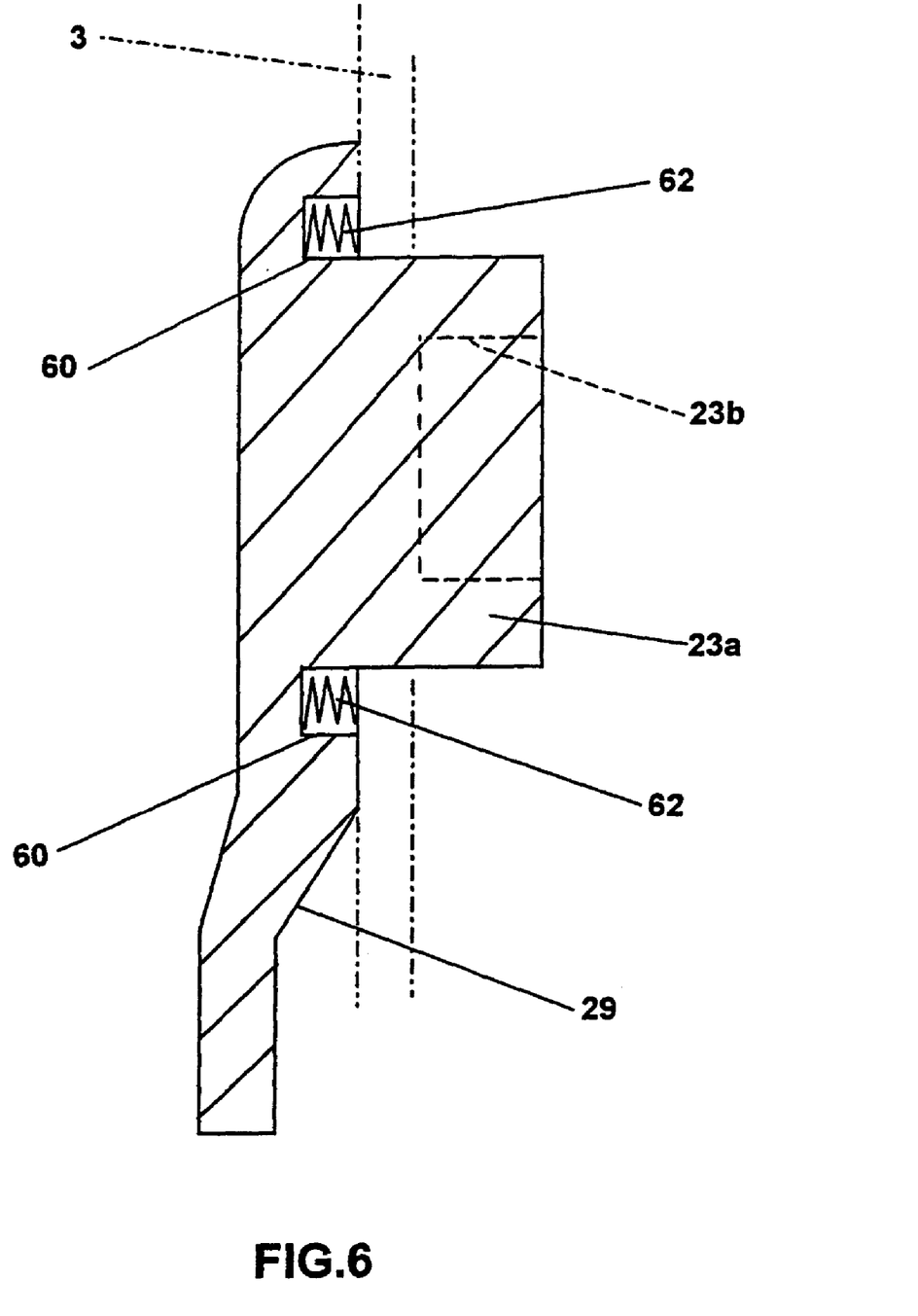
FIG. 6 is a section through an alternative pivot shaft supports for use in a pedal box according to the invention.

FIG. 6 shows a modification of the pivot shaft supports of FIGS. 1 to 5. Each is provided with an annular recess 60 centred around the pivotal axis of the pivot shaft support. In that annular recess 60 is biasing means such as a stack of Belleville washers 62 (as illustrated) or a compression coil spring (not illustrated) which biases the pivot shaft support away from the side wall of the pedal box. Other items are numbered as in FIG. 4. Identical spring means on both of the pivot shaft supports 15,17 means that they are biased apart. They move apart, releasing the pivot shaft for the control pedal, as soon as rotation of the pivot shaft supports effects release of the locking wings 23b from the butterfly-shaped holes 21.

FIGS. 7 to 13 show a collapsible pedal box according to a second embodiment of the present invention. Again the pedal box is formed from two side walls 1,3 which are bolted onto the rigid bulwark which separates the engine compartment of the automobile from the passenger compartment by the bolt-mounting holes 11. A control pedal 13 of the vehicle is pivotally mounted on a pivot shaft 50 which is journalled at its ends by pivot shaft supports 52. Each pivot shaft support 52 has a cylindrical journal portion 52a, a locking wing 54 and a land 56 (see FIG. 8). The outer profile of each pivot shaft support 52 corresponds to that of a hole 4 provided in each of the side walls 1,3 for insertion and removal. Additionally, a latch member 60 (see FIG. 9) is provided which comprises two side plates 66 with a striking plate 62 and a channelled cross member 64 therebetween. An arcuate recess 68 is formed from the base of each of the side plates 66 which, in use, receives the cylindrical journal portion 52a of the corresponding pivot shaft support 52. Two inwardly projecting spring retainers 70 are mounted on the inner surface of each side plate 66. Furthermore, an upwardly and outwardly extending detent 72 is formed from each side plate 66 which, in use, engages with a locking recess 73 in the corresponding side wall 1,3 to retain the pedal box in its normal operation condition. The pedal box further includes a release spring 74 having two forked ends 76.

Figure 7:
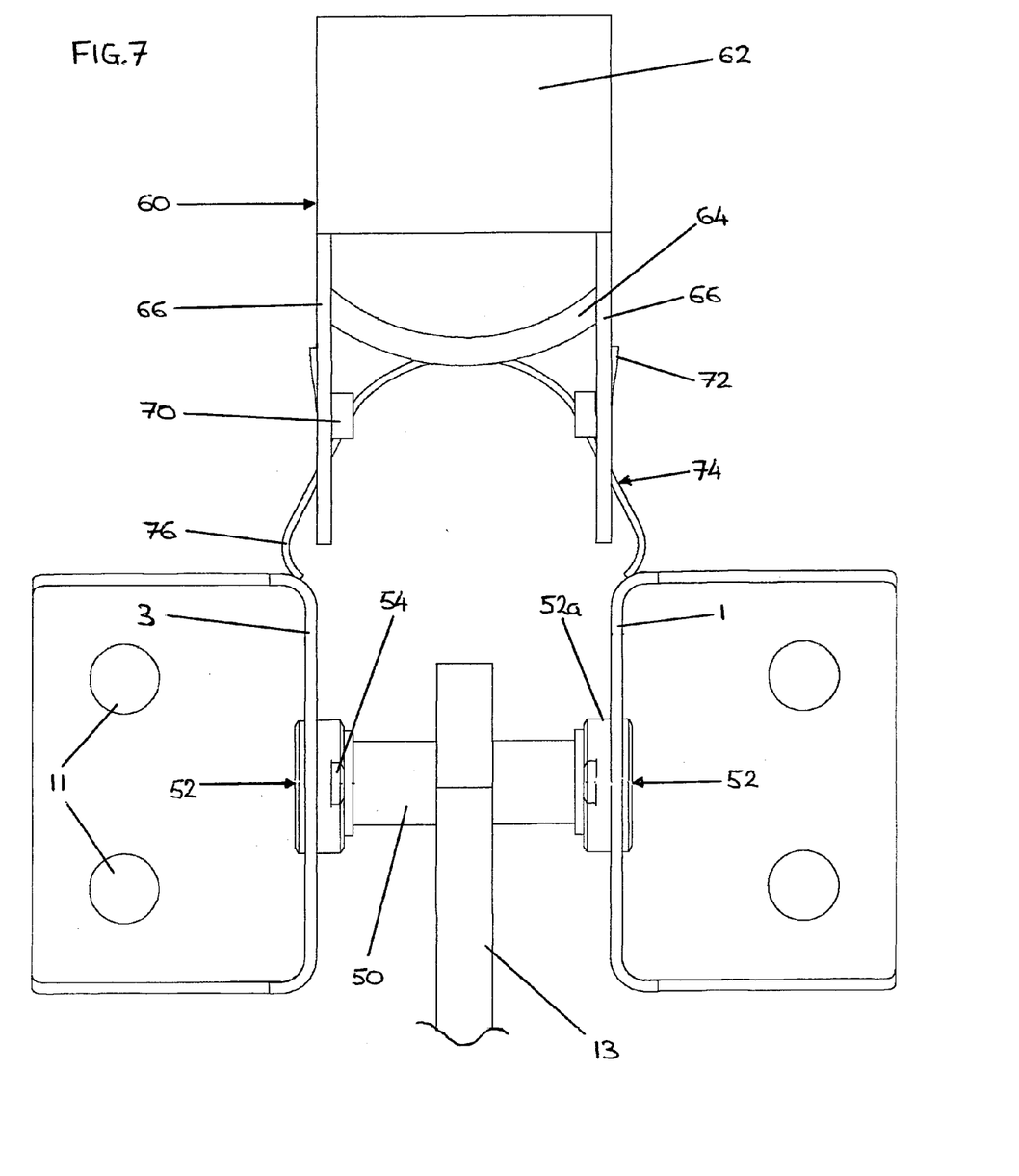
FIG. 7 is a plan view of a pedal box according a second embodiment of the invention.
Figure 8:
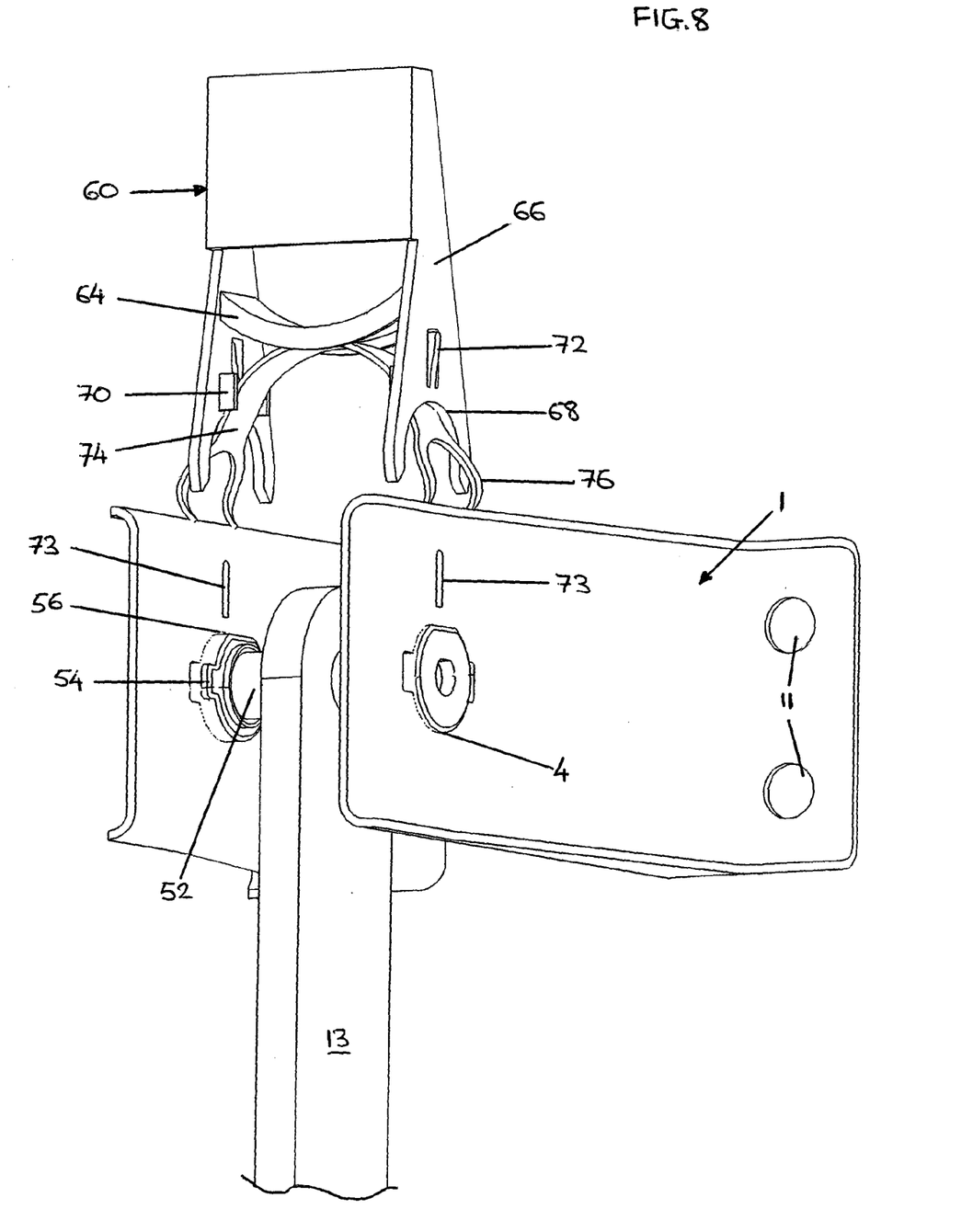
FIG. 8 is a perspective view of the pedal box of FIG. 7.
Figure 9:
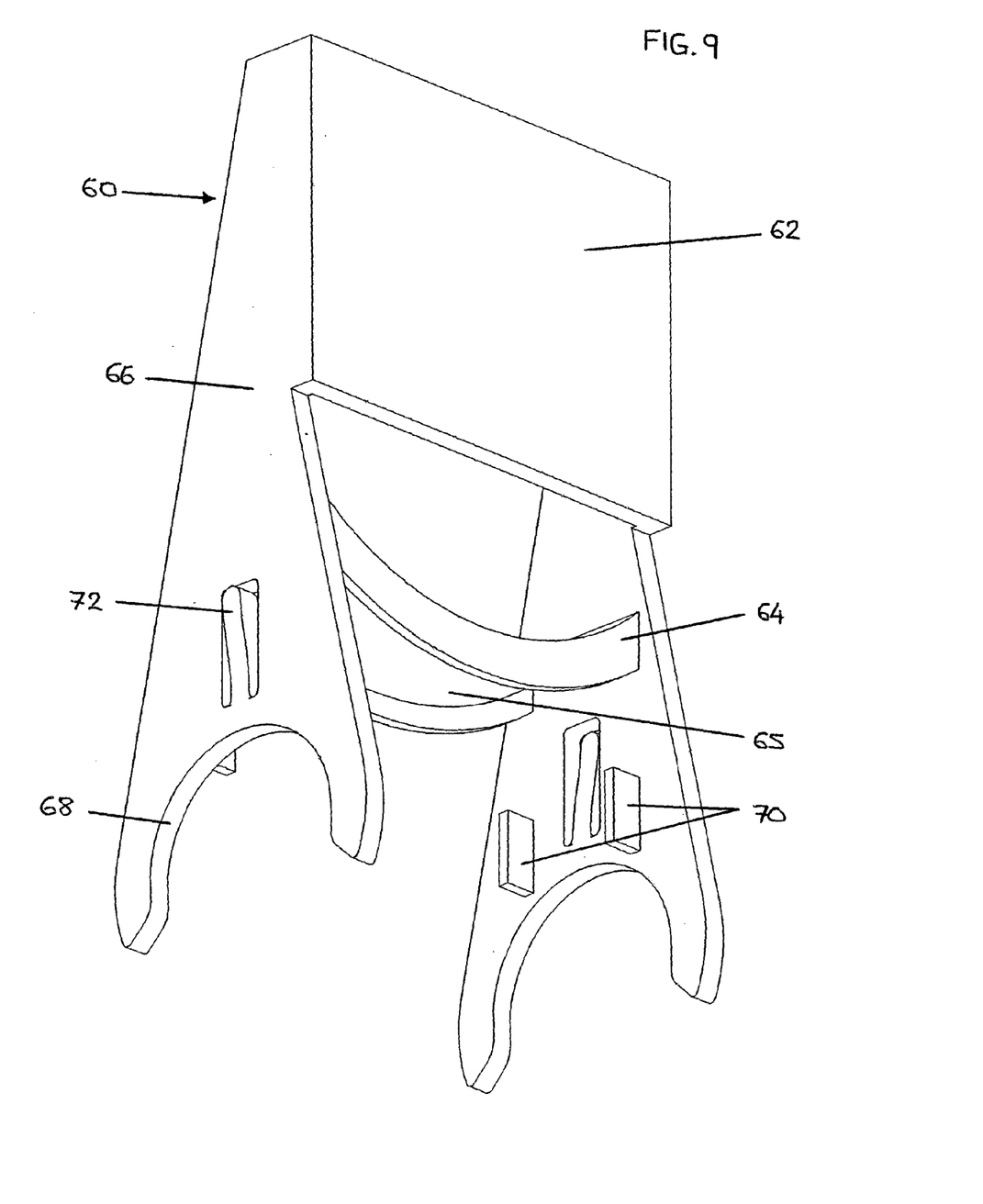
FIG. 9 is a perspective view of the latch member of FIGS. 7 and 8.

As illustrated in FIGS. 7 and 8, the control pedal 12 is mounted on its pivot shaft 50 and the pivot shaft supports 52 are inserted, locking wing side first, through the holes 4 on either side wall 1,3 to support and journal the pivot shaft 50. The release spring 74 is then located between the spring retainers 70 of the side plates 66 and the channel 65 of the-cross member 64. Although the forked ends 76 of the release spring 74 initially protrude through the arcuate recesses 68 in the side plates 66 as shown in FIGS. 7 and 8, as the entire latch member 60 is moved-downwards from the position shown to secure it in place, the forked ends 76 are forced inwards into the cavity defined between the side plates 66 and the channelled cross member 64.

Figure 10:
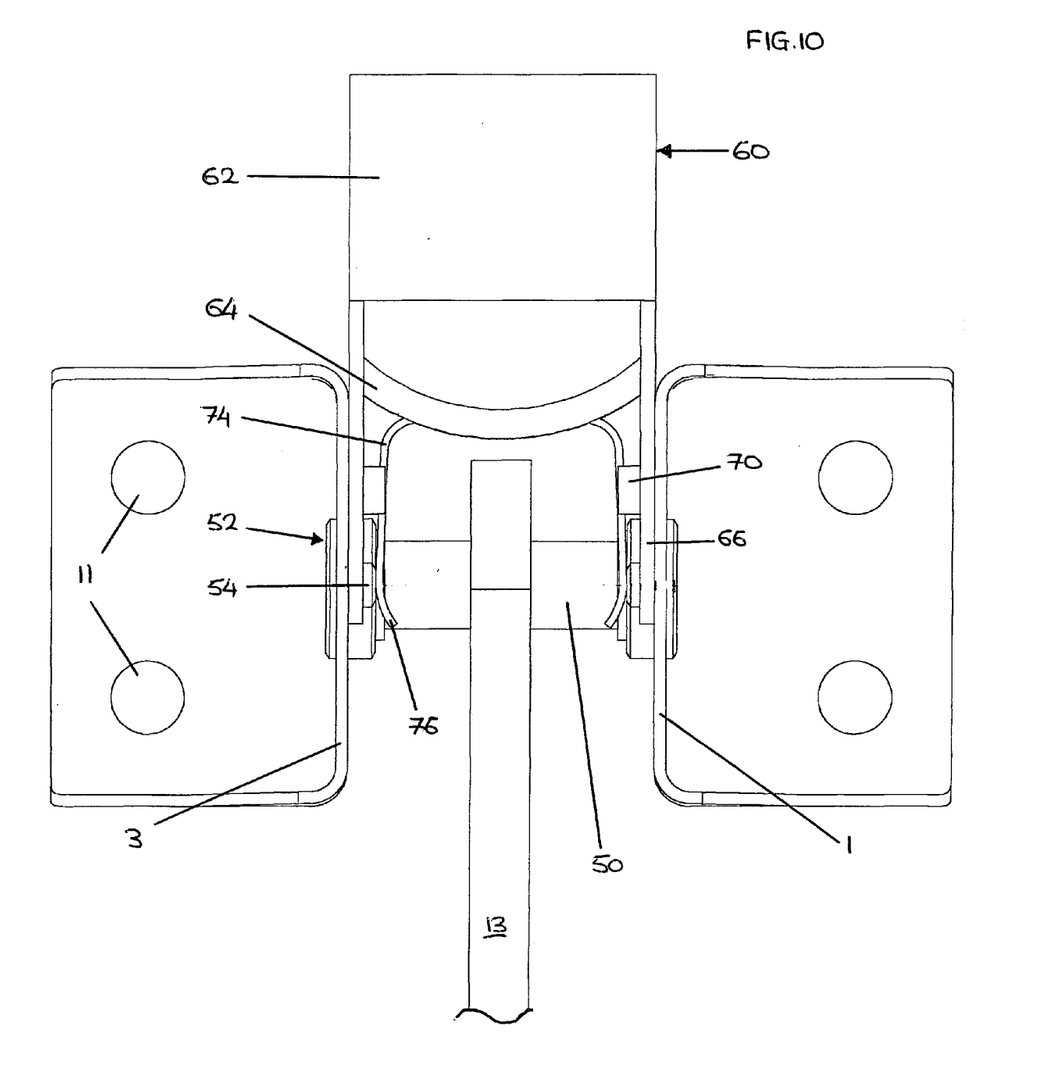
FIG. 10 is a plan view of the pedal box of FIGS. 7 and 8 in position in an automobile.
Figure 11:
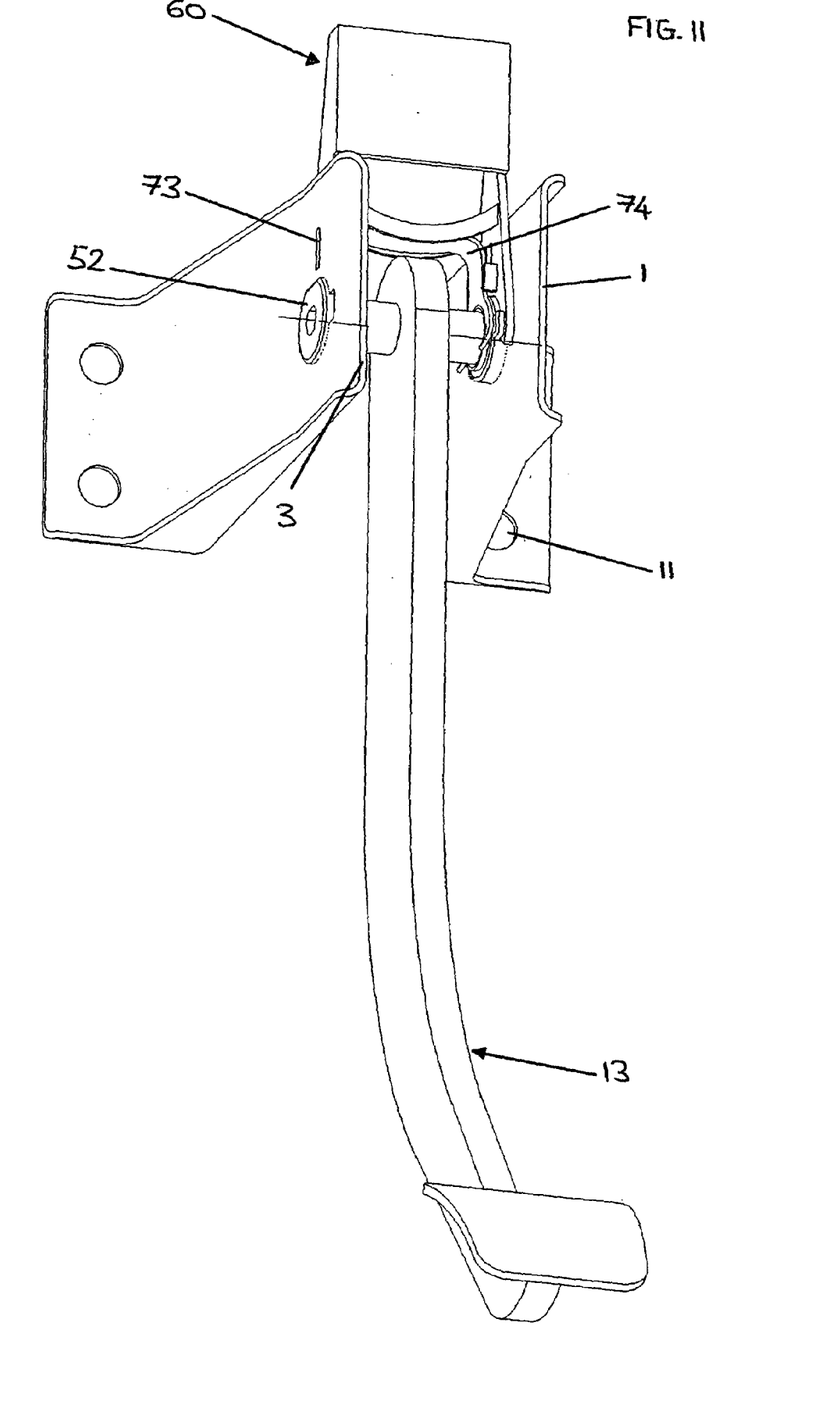
FIG. 11 is a perspective view of FIG. 10.

Further downward movement of the latch member 60 eventually causes the detents 72 of the side plates 66 to snap-fit into engagement with the corresponding locking recesses 73 of the side walls 1,3 thereby locking the pedal box in its normal operating position as shown in FIGS. 10 and 11.

Due to the deformation undergone by the release spring 74, its forked ends 76 which are in abutment with the locking wings 54 of the pivot shaft supports 52 tend to bias the supports 52 outwardly along the axis of the pivot shaft 50. However, in the normal operating position, this outwardly bias is resisted by the side plates 66 of the latch member 50. The cylindrical journal portion 52a of each pivot shaft support 52 is accommodated within the arcuate recess 68 at the base of the side plates 66 and so the locking wings 54 are retained in position between the forked ends 76 of the release spring 74 and the side plates 66 of the latch member 60.

The deformation of the release spring 74 also biases the latch member 60 upwards through its reaction on the channelled cross member 64. However, in the normal operating position, this upwards biasing of the latch member 60 is restrained by the snap-fit engagement between the detents 72 and the corresponding locking recesses 73.

Figure 12:
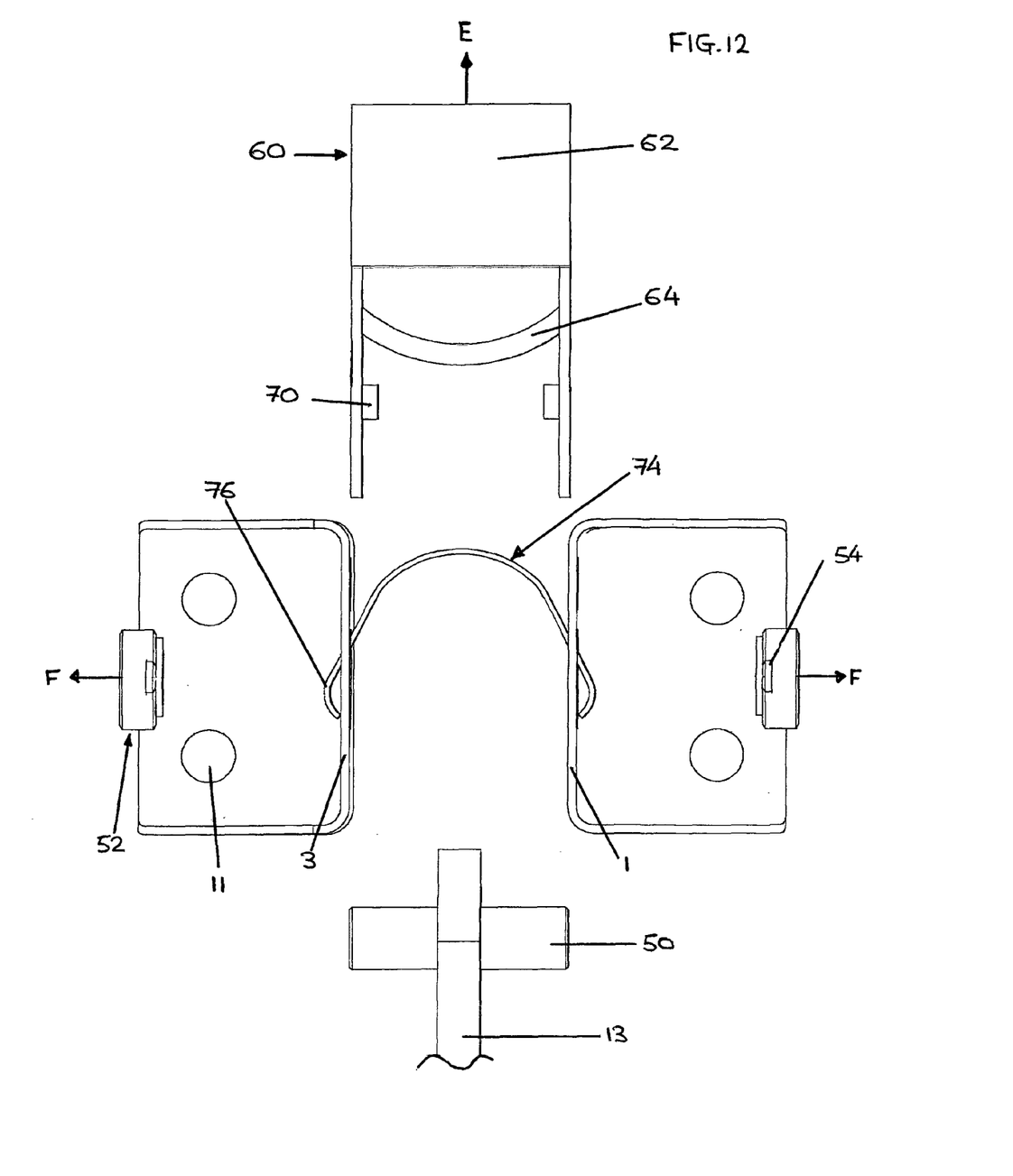
FIG. 12 is a plan view of the pedal box of FIGS. 10 and 11, illustrating what happens after the automobile has been involved in a front-end impact.
Figure 13:
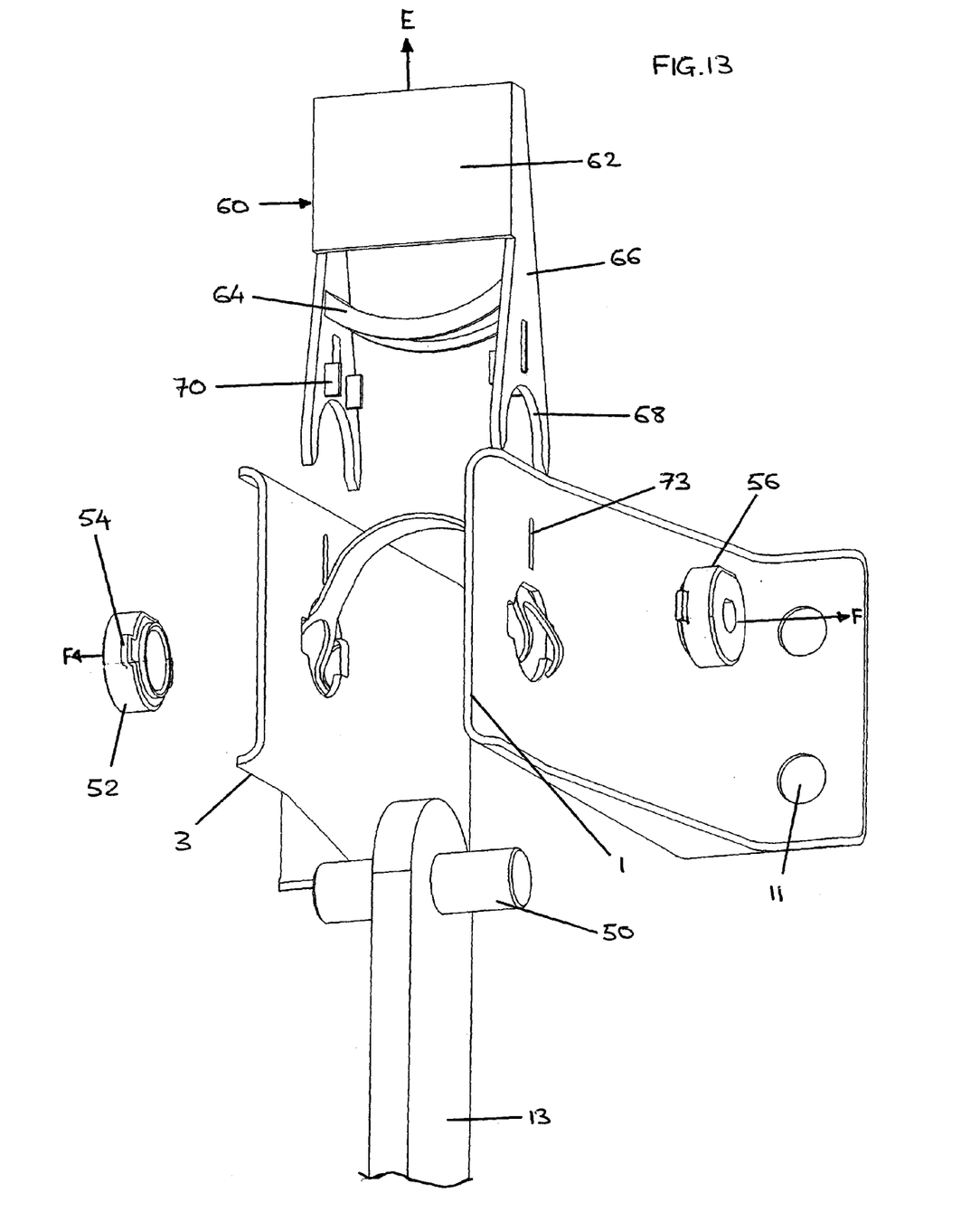
FIG. 13 is a perspective view of the pedal box of FIG. 12.

In the event of a front-end collision of the automobile, the pedal box is pushed rearwardly into the passenger compartment in the same manner as illustrated in FIG. 5. However, in this instance, the bracket 30 strikes the striking plate 62 of the latch member 60 rather than bearing against the lever portions 25,27 of the previous embodiment. As illustrated in FIGS. 12 and 13, the impact of the bracket 30 against the striking plate 62 causes the detents 72 to shear which in turn permits the release spring 74 to force the latch member 60 upwards as indicated by arrow E. As the latch member 60 moves upwards, the side plates 66 are no longer disposed between the locking wings 54 and the respective side walls 1,3. Accordingly, the release spring 74 is permitted to expand outwards and in doing so hurls the pivot shaft supports 52 outwards along the axis of the pivot shaft 50 as shown by arrows F and through the holes 4 in the side walls 1,3 of the pedal box and hence the pivot shaft 50 and control pedal 13 fall to the floor of the automobile.

Figure 14:
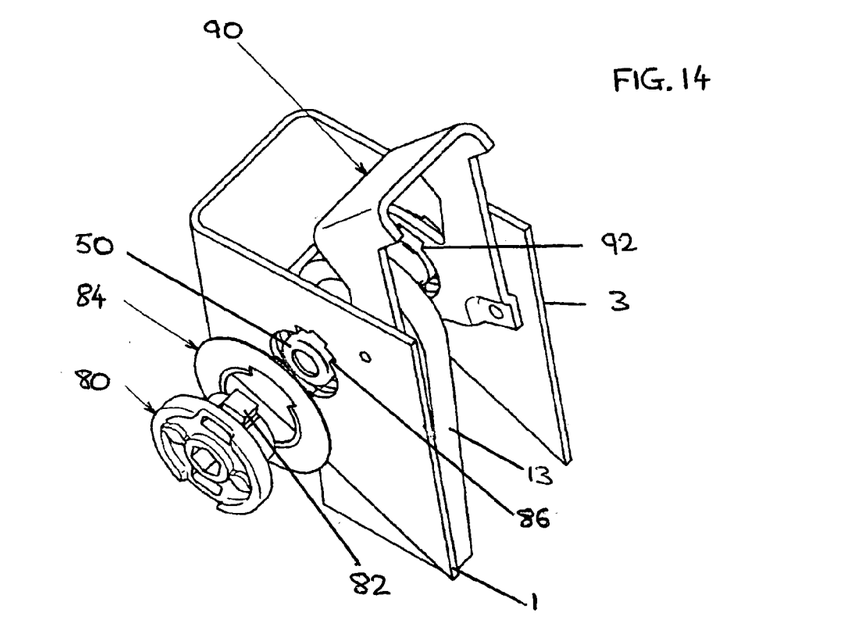
FIG. 14 is a perspective view of a pedal box according to a third embodiment of the invention, illustrating in particular how the pivot shaft and pivot shaft supports are initially installed into the pedal box.
Figure 15:
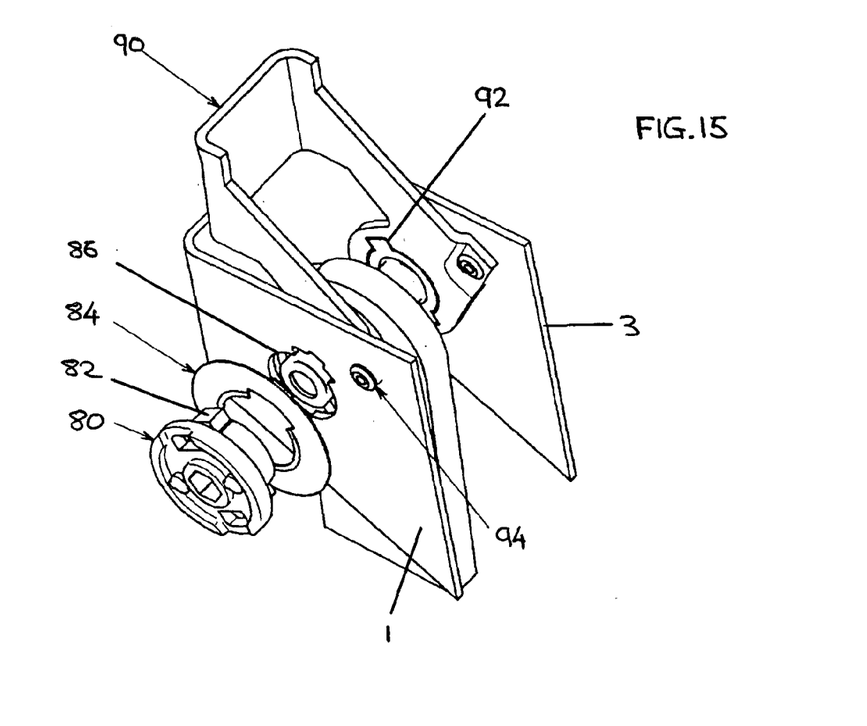
FIG. 15 is an exploded perspective view of the pedal box of FIG. 14 in which, for ease of reference, the pivot shaft support is removed from the side wall of the pedal box even though in the locked position illustrated, the locking wings of the pivot shaft supports are actually locked against the inside surface of the side walls of the pedal box preventing such removal.

The presently preferred embodiment of the present invention, which combines some of the features discussed in relation to the previously described embodiments, is illustrated in FIGS. 14 and 15. The pedal box comprises two side walls 1,3 a pivot shaft 50 on which a control pedal 13 is mounted, two spring-biased pivot shaft supports 80 and a latch 90.

FIG. 14 shows in particular how the pivot shaft 50 and pivot shaft supports 80 are initially installed into the pedal box. Either end of the pivot shaft 50 is inserted into butterfly-shaped latch holes 92 of the latch 90 which in turn is introduced between the two side walls 2,3 of the pedal box. The latch holes 92 and the pivot shaft 50 are then held in the position shown so that they are concentric with opposing butterfly-shaped holes 86 provided in the side walls 2,3. A non-rotatable plate spring 84 (only one of which is shown) is then placed over each butterfly-shaped hole 86 in the side walls 1,3 on the outer surfaces thereof. The spring 84 has a through-hole which corresponds to the butterfly-shaped hole 86. Then, the locking wings 82 of the pivot shaft supports 80 (only one of which is shown) are inserted through the through-hole of the springs 84, the butterfly-shaped holes 86 in the side walls 1,3 and into engagement with the correspondingly shaped butterfly-shaped latch holes 92 of the latch 90. Accordingly, rotation of the latch 90 causes simultaneous rotation of the pivot shaft supports 80 due to the engagement between the locking wings 82 and the butterfly-shaped latch holes 92. Once the pivot shaft 50 is held between the pivot shaft supports 80, the latch 90 can be rotated anticlockwise to lock the locking wings 82 of the pivot shaft supports 80 against the inner surfaces of the side walls 1,3, thereby preventing the pivot shaft supports 80 from moving mutually apart along the pivot shaft axis.

Although FIG. 15 represents the pedal box in the locked position, for ease of reference, the pivot shaft support 80 has been removed from the side wall 1 of the pedal box to show specifically the rotary position of the locking wings 82 in the locked condition even though in the locked condition, the locking wings 82 are actually locked against the inside surface of the side walls 1,3 of the pedal box preventing such removal. Once the latch has been rotated to the position shown, it is secured to each of the side walls 1,3 by rivets 94 to prevent accidental rotation.

In the event of a front-end vehicle collision, the pedal box is pushed rearwardly into the passenger compartment in the same manner as illustrated in FIG. 5. The bracket 30 on this occasion strikes the latch 90 with sufficient force to shear the rivets 94 and rotate the latch 90 clockwise which causes simultaneous clockwise rotation of the pivot shaft supports 80 to the position illustrated in FIG. 14. Here, the locking wings 82 are unlocked from the side walls 1,3 and due to the outward bias imposed by the springs 84, the pivot shaft supports 80 are forced mutually apart along the axis of the pivot shaft allowing the pivot shaft 50 and latch 90 to drop to the floor of the passenger compartment.

The invention claimed is:

1. A pedal box for pivotally supporting one or more control pedals of an automobile comprising:
   a pivot shaft for the one or more control pedals journalled at its ends in discrete pivot shaft end supports, the pivot shaft end supports independently moveable and releasably locked with respect to side walls of the pedal box such that they are prevented from moving outwardly along an axis of the pivot shaft; characterized in that relative movement between the pedal box and another member of the automobile in the event of a frontal impact unlocks the pivot shaft end supports with respect to the side walls so that they move mutually apart along the axis of the pivot shaft thereby causing release of the pivot shaft from the pivot shaft end supports so as to initiate collapse of the one or more control pedals.

2. A pedal box according to claim 1, wherein the pivot shaft end supports are biased apart by a cam action imparted by the relative movement between the pedal box and said other member.

3. A pedal box according to claim 1, wherein the pivot shaft end supports extend through non-circular apertures in the side walls, the pivot shaft end supports rotatively moveable to releasably lock the pivot shaft end supports with respect to the side walls and wherein relative movement between the pedal box and said another member causes rotary movement of the pivot shaft end supports unlocking the pivot shaft end supports from the side walls of the pedal box.

4. A pedal box according to claim 3, including a lever portion extending from the pivot shaft end supports, the lever portion contacting the another member during the frontal impact wherein the pivot shaft end supports are unlocked from the side walls of the pedal box.

5. A pedal box according to claim 4, wherein the pivot shaft end supports are biased apart by a cam action imparted by the relative movement between the pedal box and said other member.

6. A pedal box according to claim 5, wherein after contact between said other member and the lever portions of the pivot shaft end support has caused rotary movement of the pivot shaft end supports to unlock them from the side walls of the pedal box, continued relative movement is effective to bias apart the pivot shaft end supports by cam action.

7. A pedal box according to claim 6, wherein the cam action is reaction between an inclined surface of each of the lever portions of the pivot shaft end supports and reaction surfaces of the pedal box side walls.

8. A pedal box according to claim 3, wherein the pivot shaft end supports are biased apart by a cam action imparted by the relative movement between the pedal box and said other member.

9. A pedal box according to claim 1, wherein the pivot shaft end supports include springs biasing the pivot shaft end supports mutually apart after they have been unlocked with respect to the side walls of the pedal box.

10. A pedal box according to claim 9, wherein the pivot shaft end supports are biased apart by a cam action imparted by the relative movement between the pedal box and said other member.

11. A pedal box according to claim 9 further comprising a latch member and a release spring, wherein, in use, the latch member is locked to the side walls of the pedal box in a first position and prevents the pivot shaft end supports from moving mutually apart whereas the release spring is in a compressed state tending to bias the pivot shaft end supports mutually apart such that in the event of a frontal impact the latch member is unlocked from the side walls and moves to a second position thereby releasing the pivot shaft end supports and the release spring relaxes to force the pivot shaft end supports mutually apart along the axis of the pivot shaft through holes in the side walls of the pedal box.

12. A pedal box according to claim 11, wherein the release spring in addition to biasing the pivot shaft end supports apart, also biases the latch member from the first position to the second position.

13. A pedal box according to claim 11, wherein the latch member includes one or more fixings which engage with the side walls of the pedal box to lock the latch member in its first position and in the event of a frontal impact, the fixings fail permitting the latch member to move to the second position.

\* \* \* \* \*